United States Patent
Suryanarayanan et al.

(10) Patent No.: US 7,309,930 B2
(45) Date of Patent: Dec. 18, 2007

(54) VIBRATION DAMPING SYSTEM AND METHOD FOR VARIABLE SPEED WIND TURBINES

(75) Inventors: Shashikanth Suryanarayanan, Mumbai (IN); Aaron Avagliano, Clifton Park, NY (US); Corneliu Barbu, Guilderland, NY (US)

(73) Assignee: General Electric Company, Niskayuna, NY (US)

( * ) Notice: Subject to any disclaimer, the term of this patent is extended or adjusted under 35 U.S.C. 154(b) by 89 days.

(21) Appl. No.: 10/955,732

(22) Filed: Sep. 30, 2004

(65) Prior Publication Data

US 2006/0066111 A1    Mar. 30, 2006

(51) Int. Cl.
F03D 9/00  (2006.01)
H02P 9/04  (2006.01)
(52) U.S. Cl. ......................... 290/55; 290/44
(58) Field of Classification Search ................. 290/55, 290/44; 415/7, 2.1, 4.2, 4.3, 907, 4.5, 908
See application file for complete search history.

(56) References Cited

U.S. PATENT DOCUMENTS

| | | | | |
|---|---|---|---|---|
| 4,189,648 | A | * | 2/1980 | Harner .................... 290/44 |
| 4,323,331 | A | * | 4/1982 | Schachle et al. ............ 416/9 |
| 4,420,692 | A | * | 12/1983 | Kos et al. .................... 290/44 |
| 4,435,647 | A | * | 3/1984 | Harner et al. ............... 290/44 |
| 4,461,957 | A | * | 7/1984 | Jallen ......................... 290/44 |
| 4,695,736 | A |   | 9/1987 | Doman et al. ............... 290/44 |
| 5,798,632 | A | * | 8/1998 | Muljadi ..................... 322/29 |
| 6,213,721 | B1 | * | 4/2001 | Watkinson .............. 416/244 A |
| 6,420,795 | B1 | * | 7/2002 | Mikhail et al. ............. 290/44 |
| 6,695,588 | B1 | * | 2/2004 | Nielsen ................... 416/244 R |
| 6,876,099 | B2 | * | 4/2005 | Wobben ..................... 290/44 |
| 2003/0151260 | A1 | * | 8/2003 | Siegfriedsen ............... 290/44 |
| 2004/0096329 | A1 | * | 5/2004 | Engstrom ............... 416/132 B |
| 2005/0276696 | A1 | * | 12/2005 | LeMieux ................... 416/61 |

* cited by examiner

*Primary Examiner*—Julio Gonzalez
(74) *Attorney, Agent, or Firm*—Fletcher Yoder

(57) ABSTRACT

A vibration damping technique for a wind turbine system is described. The wind turbine system includes a vibration damper, which provides a variable signal to control torque produced by a generator of the wind turbine system. The variable signal is based on generator speed and has a first local peak value based on a resonant frequency of tower side-to-side oscillation.

7 Claims, 5 Drawing Sheets

VIBRATION DAMPING SYSTEM AND METHOD FOR VARIABLE SPEED WIND TURBINES

STATEMENT REGARDING FEDERALLY SPONSORED RESEARCH & DEVELOPMENT

This invention was made with Government support under Contract ZAM-7-13320-26 under Prime Contract DE-AC36-83CH10093.

BACKGROUND

The invention relates generally to the field of wind turbines, and in particular to an active vibration damping solution for variable speed wind turbines.

Wind turbines are regarded as environmentally safe and relatively inexpensive alternative sources of energy. A wind turbine generally includes a rotor that has multiple blades which transform wind energy into a rotational motion of a drive shaft. The drive shaft is utilized to rotate a rotor of an electrical generator. The turbine rotor is rotationally coupled to the generator by a drive train comprising a gear box. The gear box steps up the relatively low rotational speed of the turbine rotor to a more appropriate speed for the generator to efficiently convert the rotational motion to electrical energy. The electrical energy may then be supplied to a utility grid. Typically, the drive train and the generator are housed in a nacelle mounted atop a tower.

Wind shear on the rotating blades causes periodic angular accelerations and decelerations of the rotor, which in turn induces torque oscillations in the drive train. Generally, the drive train is composed primarily of steel components and therefore, exhibits poor passive damping characteristics. Poor damping causes excessive vibrations that adversely affect the life of the turbine components. This situation necessitates active damping solutions that reduce dynamic loads on the drive train and/or turbine structure vibrations.

Present vibration damping solutions generally utilize generator demand torque as an active damping input. Fixed speed wind turbines use induction generators, which have a linear torque-slip curve in the operating region of interest. The generator demand torque produced by such machines is directly proportional to a generator speed. This operational characteristic of induction generators naturally aids in damping oscillations in the drive train. However, active damper designs are necessitated in the case of variable speed wind turbines, which use doubly-fed induction drives. In such machines, the torque demand is no longer restricted to being proportional to slip, resulting in a loss of damping performance. In the past, drive train damping solutions for variable-speed wind turbines have been based on two or three mass lumped parameter descriptions of the dynamics of the drive train. These designs use generator speed feedback as a damper input to damp oscillations induced by drive train resonance by presuming the resonant frequencies of the drive train.

However, such designs often turn out to be inadequate due to one or more of the following reasons. First, since turbines are often configured using components from different vendors, it is difficult to obtain accurate estimates of resonance frequencies of the drive train. This results in sub-optimal operation across various turbine configurations. Secondly, current drive train damping solutions do not mitigate tower side-to-side oscillations, which coupled to the torque oscillations of the drive train.

Accordingly, there is a need for an active damping solution for variable speed wind turbines for mitigating dynamic loads on drive train as well as on the tower, while providing the ability to adapt to different turbine configurations.

BRIEF DESCRIPTION

The present technique provides a novel approach designed to respond to the needs described above. In one aspect of the present technique, a vibration damping system is provided for a wind turbine system. The wind turbine system includes a vibration damper, which provides a variable signal to control torque produced by a generator of the wind turbine system. The variable signal is based on generator speed and has a first local peak value based on a resonant frequency of tower side-to-side oscillation.

In another aspect, a method is provided for damping vibrations in a wind turbine. In accordance with the method, a generator demand torque is determined based on sensed speed of the generator. The generator demand torque is modulated by providing a signal based on changes in generator rotor speed. The signal has a first peak value based on a tower side-to-side resonant frequency, and a second peak value based on a drive train resonant frequency.

In yet another aspect, a computer program is provided. The computer program includes code adapted receive an input indicative of speed of a generator, and to compute a response for controlling torque produced by the generator based on the input indicative of the speed of the generator. The response has a first peak value based on a tower side-to-side resonant frequency, a lower value relative to the first peak value at a rotor frequency of the generator corresponding to a blade pass frequency, and a second peak value based on a drive train resonant frequency.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

The present technique provides an optimal vibration damping solution for variable speed wind turbines. As will be described in detail hereinafter, the present technique not only aids damping of drive train vibrations caused by variation in wind speed, but also mitigates tower loads caused by side-to-side oscillations of the tower. Further, the technique advantageously reduces power fluctuations of the generator coupled to the wind turbine rotor.

Figure 1:
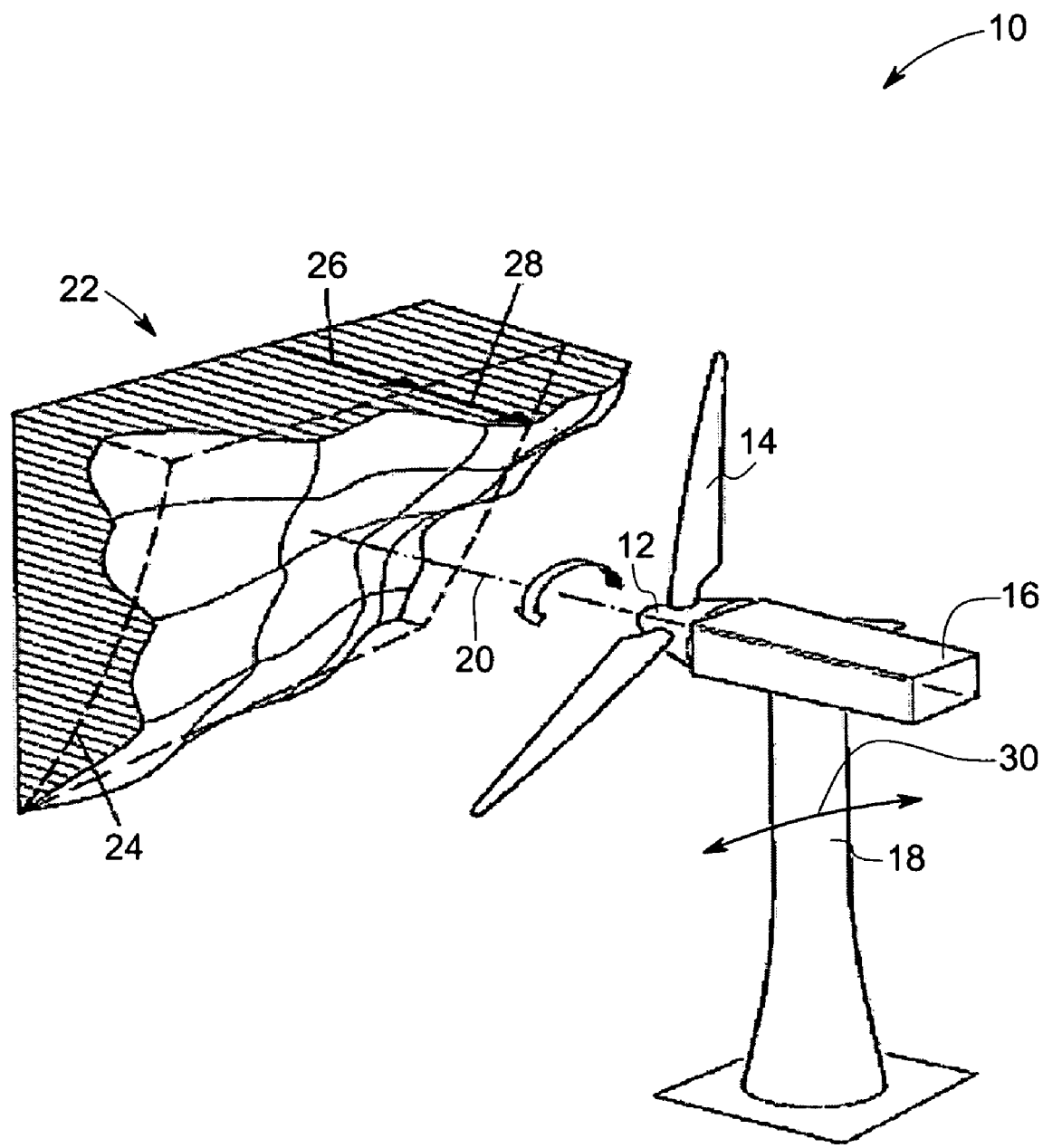
FIG. 1 is a schematic illustration of a wind turbine system, to which embodiments of the present technique are applicable.

Referring generally to FIG. 1, a wind turbine system 10 operable to generate electric power is provided. The wind turbine system 10 comprises a rotor 12 having multiple blades 14. The wind turbine system 10 also comprises a nacelle 16 that is mounted atop a tower 18. The rotor 12 is drivingly coupled to components of the wind turbine system 10 housed within the nacelle 16. The tower 18 exposes the blades 14 to the wind, which cause the blades 14 to rotate about an axis 20. The blades 14 convert the mechanical energy of the wind into a rotational torque, which is further converted into electrical energy by the wind turbine system 10.

The velocity of wind blowing on the blades 16 and the tower 18 varies in space and in time. An example of an instantaneous velocity profile of the wind is represented generally by the reference numeral 22. At a given time, the velocity of the wind varies with height. This is indicated by a surface 24, the width of which at any height is proportional to the mean wind velocity at that height. As can be appreciated from the illustrated profile, wind velocity generally increases with height. As a result, a blade 14 is subjected to a greater wind velocity when it is extending vertically upward from the rotor 12 as it rotates about the axis 20 than it is when it is extending vertically downward from the rotor 12. This difference in wind velocity creates a force on the rotating blades 14, which is referred to as wind shear. Furthermore, at a given height, the wind velocity may be divided into two components. The first component 26 is a mean wind velocity at that height and the second component 28 represents a disturbance in wind velocity caused by stochastic turbulence. Wind shear causes periodic angular acceleration and deceleration of the turbine rotor, setting up torque oscillations in the drive train. Oscillations in the drive train cause periodic bending loads on the tower 18, which is structurally equivalent to a cantilever. This leads to side-to-side oscillations of the tower 18, represented by arrow 30.

Figure 2:
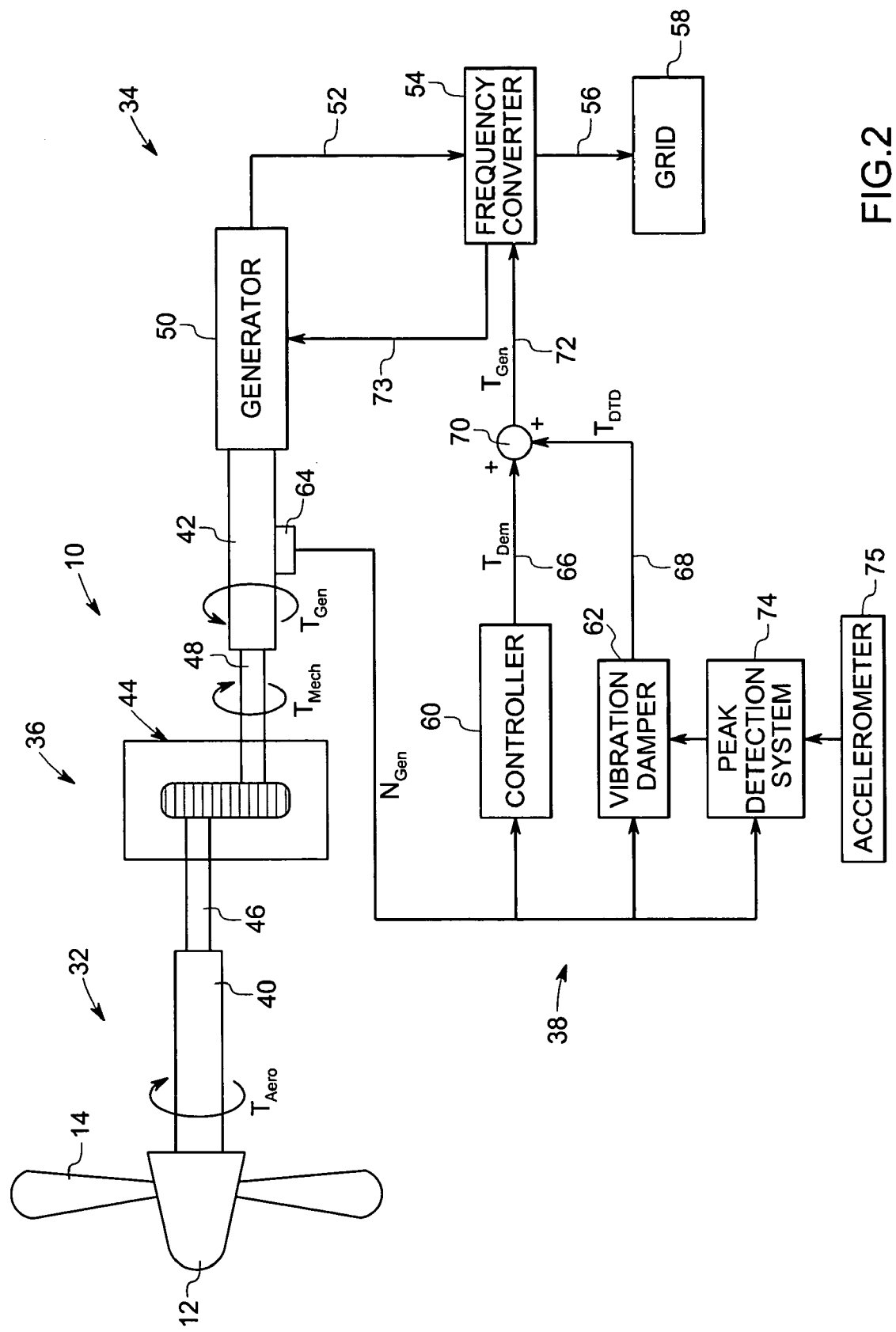
FIG. 2 is a schematic illustration of a vibration damping mechanism according aspects of the present techniques.

Referring generally to FIG. 2, the wind turbine system 10 comprises a turbine portion 32 that is operable to convert the mechanical energy of the wind into a rotational torque ($T_{Aero}$) and a generator portion 34 that is operable to convert the rotational torque produced by the turbine portion 32 into electrical power. A drive train 36 is provided to couple the turbine portion 32 to the generator portion 34.

The wind turbine system 10 also comprises a vibration damping system 38 that is operable to control the torque produced by the generator portion 34 to reduce vibrations in the drive train 36 and the tower 18 (shown in FIG. 1). The turbine portion 32 comprises the rotor 12 and a turbine rotor shaft 40 that is coupled to the rotor 12. Rotational torque is transmitted from the rotor shaft 40 to a generator shaft 42 via the drive train 36. In certain embodiments, such as that embodiment illustrated in FIG. 2, the drive train 36 includes a gear box 44 transmitting torque from a low speed shaft 46 coupled to the rotor shaft 40 to a high speed shaft 48 coupled to the generator shaft 42. The turbine rotor shaft 40 is rotationally coupled to a low speed shaft 42 of a gear box 44 that is provided to transmit rotational torque from the low speed shaft 42 to a high speed shaft 46. The high speed shaft 46 is, in turn, coupled to a generator shaft 48. The generator shaft 48 is coupled to the rotor (not shown) of an electrical generator 50. As the speed of the turbine rotor 40 fluctuates, the frequency of the output 52 of the generator 50 also varies. The generator portion 34 also comprises a frequency converter 54 that is used to convert the variable frequency output 52 of the generator 50 into a fixed frequency output 56 for supply to a power grid 58.

The generator 50 produces an air gap torque, also referred to as generator torque ($T_{Gen}$), which opposes the aerodynamic torque ($T_{Aero}$) of the turbine rotor 12. The generator 50 of the present embodiment comprises a doubly fed induction drive that enables the air gap torque to be controlled independently of the torque produced by the turbine rotor 12. In the illustrated embodiment, the air gap torque ($T_{Gen}$) of the generator 50 is controlled by the frequency converter 54.

The vibration damping system 38 comprises a controller 60, a vibration damper 62, and a sensor 64 that is operable to provide a signal representative of generator shaft 46 speed ($N_{Gen}$). The controller 60 receives the signal representative of generator shaft speed ($N_{Gen}$) provided by a speed sensor 64 and provides a signal 66 to direct the generator 50 to produce a generator torque corresponding to demand on the generator ($T_{Dem}$) that is based on the speed signal. The generator demand torque ($T_{Dem}$) at a given generator speed is the generator torque necessary to obtain maximum power efficiency of the generator 50 at the given generator speed. The controller 60 establishes the signal 66 to produce the generator demand torque ($T_{Dem}$) based on a relationship between generator speed and generator torque. The relationship may comprise a mathematical function between generator speed and generator torque to optimize generator power output. In this embodiment, the function is defined such that generator torque is proportional to the square of the generator speed for generator speeds lower than a rated speed and is constant and equal to a maximum nominal torque for generator speeds greater than the rated speed. In a different embodiment, the relationship may comprise a look up table containing generator torque values corresponding to generator speed values to produce maximum power.

As discussed in greater detail below, the vibration damper 62 of the vibration damping system 38 is provided to control the generator torque ($T_{Gen}$) to reduce vibrations in the system 10. The vibration damper 62 also receives the signal representative of generator shaft speed ($N_{Gen}$) provided by a speed sensor 64 and identifies vibration frequencies based on changes produced in the generator shaft speed ($N_{Gen}$) by the vibrations. The signal 66 produced by the controller 60 of the vibration damping system 38 is modulated by a signal 68 from the vibration damper 62, represented by a junction 70. The modulated signal 72 is coupled to the frequency converter 54 to produce the generator torque ($T_{Gen}$). The frequency converter 54 receives the modulated signal 72 and is operable to provide an excitation signal 73 to the windings (not shown) of the generator 50, thereby controlling the air gap torque ($T_{Gen}$) of the generator 50. The controller 60 may comprise a signal processor configured to calculate generator demand torque for a sensed generator speed from a defined speed-torque relationship residing in the hardware or software. In one embodiment, the controller 60 comprises a proportional integral (PI) controller. The frequency converter 54 may include, for example a cycloconverter, or a rectifier-inverter pair linked by a direct current (DC) bus.

As described above, angular accelerations and decelerations of the rotor 12 sets up torque oscillations in the drive train 36, which further induce tower side-to-side oscillations. Torque oscillation of the drive train may be damped by producing a generator torque that opposes the oscillations. The vibration damper 60 is configured to modulate the generator demand torque ($T_{Dem}$), thereby controlling the generator torque in such a way as to reduce the amplitude of the vibrations of the drive train 36 and the tower 18 at frequencies corresponding to the natural frequencies of the drive train 36 and the tower 18. The damper 60 produces a modulating signal 68 that is summed with the signal 66 from the controller 60 at a junction 70 to provide a composite signal 72 indicative of generator demand torque to the frequency converter 54. The damper signal 68 is based on the generator rotor frequency ($\omega$), which is directly proportional to the sensed generator rotor speed ($N_{Gen}$). The characteristics of the signal 68 are dependent on the natural or resonant frequencies of the drive train 36 and the tower 18. In the illustrated embodiment, the resonant frequencies of the drive train 36 and the tower 18 are computed on-line via a peak detection system 74, which provides the computed resonant frequencies to the damper 62. The peak detection system 74 periodically samples the generator rotor speed ($N_{Gen}$). Vibrations will cause changes in the generator rotor speed ($N_{Gen}$). The peak detection system 74 converts the changes in generator rotor speed ($N_{Gen}$) from the time domain to the frequency domain. In one embodiment, the peak detection system 74 comprises a computer with data processing software adapted to compute drive train and tower resonant frequencies via a Fourier transform based algorithm. In a different embodiment, the peak detection system 74 may be adapted to determine tower side-to-side resonant frequency by sampling tower acceleration, which is sensed by an accelerometer 75 disposed on the tower 18. The accelerometer 75 may be adapted to be responsive to acceleration of the tower 18 in the direction of the rotation axis 20 of the rotor 12.

Figure 3:
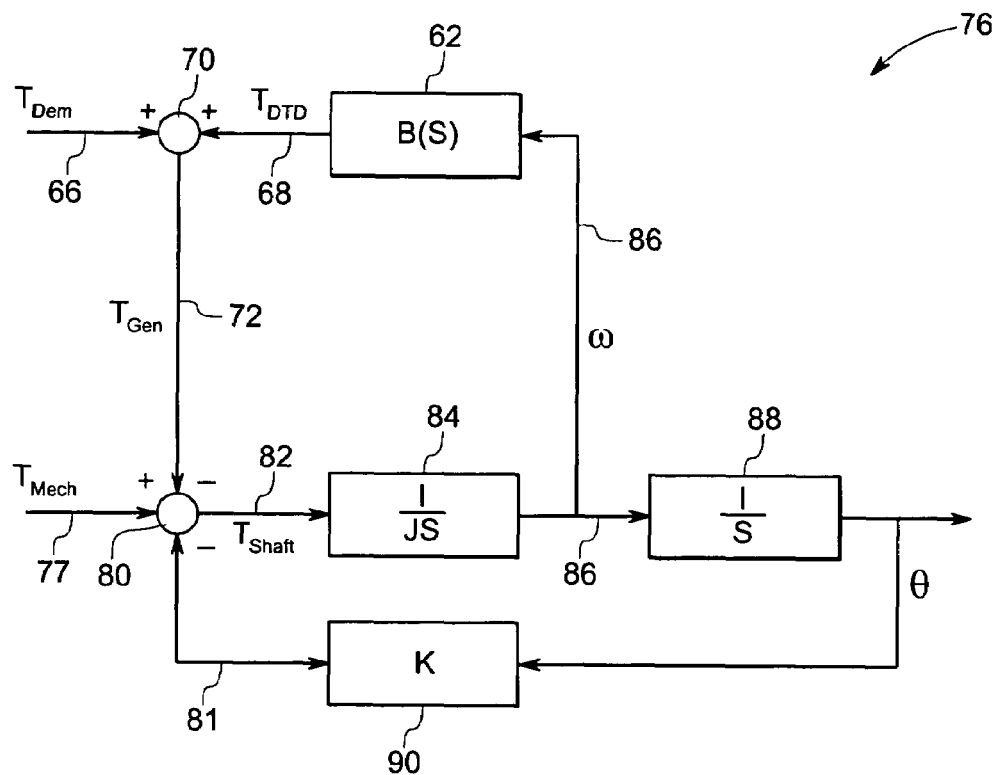
FIG. 3 is a schematic representation closed-loop damping system in accordance with the present technique.

Referring generally to FIG. 3, a closed-loop model 75 of the system 10 is provided. The closed-loop model 76 reflects the different torques that affect the speed of the generator. Please note that the blocks shown in FIG. 3 are representative of their respective transfer functions in the Laplace domain. The closed-loop model 76 is mathematically derived from the dynamics of the wind turbine system 10 (shown in FIG. 1). For example, the drive train 36 of FIG. 1 may be considered as a spring-mass system, which yields the following relationship:

$$T_{Mech} - T_{Gen} - K\theta_G = J\ddot{\theta}_G \qquad (1)$$

where:

$T_{Mech}$ is the mechanical torque transmitted to the generator shaft 46 by the turbine rotor 12;

$T_{Gen}$ is the air gap torque produced by the generator;

K is the stiffness constant of the drive train 36;

$\theta_G$ represents the angular displacement; and $\ddot{\theta}_G$ represents the angular acceleration of the generator shaft.

The closed-loop model 76 receives an input 77 that represents the torque ($T_{Mech}$) of the rotor and an input 72 that represents the torque of the generator ($T_{Gen'}$). The inputs 77 and 72 are summed at a junction 80, where the input 77 that is representative of the torque ($T_{Mech}$) of the rotor has a positive value and the input 78 that is representative of the torque of the generator ($T_{Gen'}$) has a negative value. The junction 80 also receives an input 81 that represents a restoring torque ($K\theta_G$) induced by the stiffness of the drive train 36. The restoring torque input 81 also has a negative value. The output 82 of the junction 80 of junction 82 denotes a net mechanical torque ($T_{shaft}$) that drives the generator shaft 46. This net mechanical torque ($T_{Shaft}$) is responsible for the angular acceleration ($\ddot{\theta}_G$) of the generator shaft, which after integration at block 84 yields the angular frequency ($\omega$) of the generator, denoted by reference numeral 86. The angular frequency ($\omega$) of the generator is obtained by the speed sensor 64 of FIG. 2. The damper 62 receives the signal indicative of generator frequency ($\omega$) as an input and amplifies the signal to produce a response signal. The amplification or gain of the damper is governed by a transfer function B(s). The transfer function B(s) is discussed in more detail below.

Electrical inputs for the model 75 are the torque demand ($T_{Dem}$) provided by the controller 60 of FIG. 2 and the damping torque ($T_{DTD}$) 68 provided by the damper. The electrical inputs 66 and 68 are summed at the junction 70 to yield the generator torque ($T_{Gen}$) 72.

The torque ($T_{Mech}$) transmitted by the turbine rotor 12 can be decomposed into a constant component ($T_{Const}$) and a variable component ($T_{Dist}$) caused by wind disturbances. The variable component ($T_{Dist}$) may be further decomposed into a periodic component ($T_{per}$) caused by periodic wind shear effect on the rotating blades as explained earlier and a turbulent component ($T_{Turb}$) caused by stochastic turbulence in the wind velocity. The above may be represented by the following relationships:

$$T_{Mech} = T_{Const} + T_{Dist} \qquad (2)$$

$$T_{Dist} = T_{Per} + T_{Turb} \qquad (3)$$

Under high wind speed conditions, the torque demand determined by the controller 60 generally has a constant value, which is configured to be substantially equal to the constant component ($T_{Const}$). Therefore, at high wind speeds, the damper 62 operates in such a way as to damp out the torque excitation caused in the drive train by the variable component ($T_{Dist}$).

Figure 4:
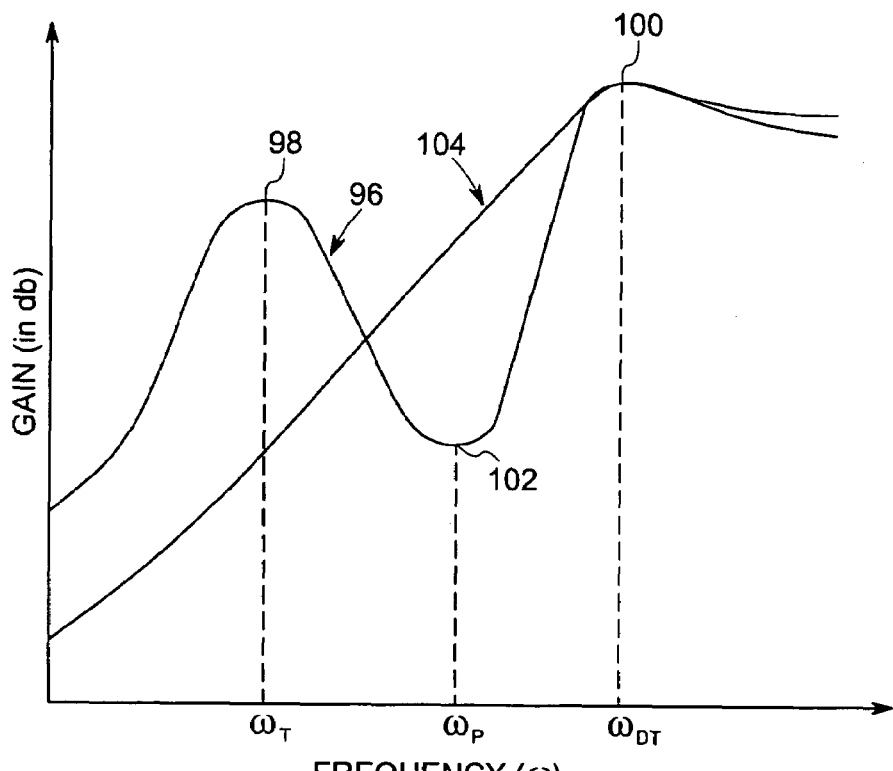
FIG. 4 is a graphical illustration of frequency response of the vibration damper according to the present techniques.

Referring generally to FIG. 4, an exemplary damper frequency response 96 is provided. The damper frequency response 96 provides the damper gain (in dB) as a function of generator rotor frequency ($\omega$). In the damper frequency response 96, the gain is small for low values of ($\omega$) to reduce power fluctuations of the generator 50 at low generator frequencies, such as during start up. The response has a first peak value 98 for a generator rotor frequency in the neighborhood of a resonant frequency $\omega_T$ (also referred to as fundamental frequency) of the tower 18, and a second peak value 100 for a generator rotor frequency in the neighborhood of a resonant frequency $\omega_{DT}$ of the drive train 36. In one embodiment, $\omega_T$ and $\omega_{DT}$ correspond to the first fundamental frequency of the tower and the drive train respectively. The damper response is high at generator frequencies corresponding to the resonant frequencies of the tower 18 and the drive train 36, providing increased generator demand torque to the frequency converter 54 at these generator rotor frequencies. This causes the generator 50 to produce increased air gap torque at these frequencies, thus damping out the oscillation amplitudes of the drive train 36 and the tower 18 at such resonant frequencies. The damper 62 may also be designed as a high-pass filter, providing a substantially constant high gain for frequencies higher than $\omega_{DT}$. This aids damping drive train and tower oscillations at their higher fundamental frequencies.

The damper may also be configured to provide relatively low gains for generator frequencies in the region of a blade pass frequency $\omega_P$ of the wind turbine. In the illustrated embodiment, the response 96 includes a valley or local minima 102 for a generator rotor frequency corresponding to the blade pass frequency ($\omega_P$). The blade pass frequency ($\omega_P$) is the frequency of passage of one blade of the wind turbine as perceived by the drive train. This is numerically equal to the number of blades on the turbine rotor 12 multiplied by an angular frequency of the turbine rotor. Thus for a wind turbine having three blades and a turbine rotor frequency given by $\omega_R$, the blade pass frequency ($\omega_P$) is equal to 3 $\omega_R$.

Low damper gain for generator frequencies in the region of the blade pass frequency $\omega_P$ is advantageous in several ways. As described earlier, wind shear effect causes the drive train to be excited a periodic torque ($T_{per}$) with a frequency equal to the blade pass frequency. Low generator torque at generator frequencies close to the blade pass frequency reduces excitation of the drive train at the blade pass frequency. Further, it has been observed that power fluctuation of the generator is maximum when the generator frequency corresponds to the blade pass frequency. The present techniques advantageously reduce power fluctuation significantly by producing a low generator torque at the blade pass frequency.

The transfer function B(s) provides a relationship between generator rotor frequency and damper response, which may be coded in software residing in the damper 62. Such a relationship is generally described by an ordinary differential equation, which may be discretized into a difference equation implemented in software. The transfer function B(s) is adapted to provide high gains for generator frequencies corresponding to drive train and tower resonant frequencies, and a low gain at a generator frequency corresponding to the blade pass frequency. The vibration damper transfer function B(s) may accordingly be represented by the following equation in Laplace domain:

$$B(s) = \left(\frac{K_T s(1 + \tau_T s)}{s^2 + 2\zeta_T \omega_T s + \omega_T^2} + \frac{K_{DT} s(1 + \tau_{DT} s)}{s^2 + 2\zeta_{DT} \omega_{DT} s + \omega_{DT}^2}\right) \times \qquad (4)$$

$$\left(\frac{1}{\omega_P^2}\right) \frac{s^2 + 2\zeta_P \omega_P s + \omega_P^2}{(1 + \tau_P s)^2}$$

where $K_T$, $\zeta_T$, $\tau_T$, $K_{DT}$, $\zeta_{DT}$, $\tau_{DT}$, $K_P$, $\zeta_P$ and $\tau_P$ are various damper parameters which can be tuned once $\omega_T$, $\omega_{DT}$ and $\omega_P$ are known. In the equation K represents gain, $\zeta$ represents damping ratio and $\tau$ represents delay. The subscripts $_T$, $_{DT}$, and $_P$ are used to respectively denote tower side-to-side oscillations, drive train oscillations and excitation at multiple blade passing frequency.

The expression $$\frac{K_T s(1 + \tau_T s)}{s^2 + 2\zeta_T \omega_T s + \omega_T^2}$$

in equation (4) is responsible for a peak gain at ($\omega_T$) and is referred to as tower compensation component of the transfer function.

The expression $$\frac{K_{DT} s(1 + \tau_{DT} s)}{s^2 + 2\zeta_{DT} \omega_{DT} s + \omega_{DT}^2}$$

in equation (4) is responsible for a peak gain at ($\omega_{DT}$), and is referred to as drive train compensation component of the transfer function The expression $$\left(\frac{1}{\omega_P^2}\right) \frac{s^2 + 2\zeta_P \omega_P s + \omega_P^2}{(1 + \tau_P s)^2}$$

in equation (4) is responsible for a valley or local minima for gain at the blade pass frequency ($\omega_P$).

In currently used vibration dampers, the transfer function B(s) comprises only a component for drive train compensation. An exemplary frequency response of such dampers is illustrated generally by the numeral 104 in FIG. 4. The response 104 has a peak around the drive train resonant frequency and may have high-pass characteristics for higher generator frequencies.

As described earlier, damper parameters can be tuned after knowledge of drive train and tower resonant frequencies ($\omega_{DT}$ and $\omega_T$ respectively). Aspects of the present technique provide a method to compute the resonant frequencies ($\omega_T$ and $\omega_T$) on-line, based on generator frequency $\omega$ sampled over time. In the present embodiment, resonant frequencies are computed via a Fourier transform based peak detection algorithm. The above is based on the principle that frequency content of any signal can be inferred from its Fourier transform. Since the generator frequency ($\omega$) is derived from drive train dynamics, the frequency content of the generator frequency ($\omega$) should have a peak at the fundamental frequency of the drive train. Therefore, determining the drive train fundamental frequency reduces to the problem of determining peaks in the plot between $\omega$ and its Fourier transform X($\omega$).

Figure 5:
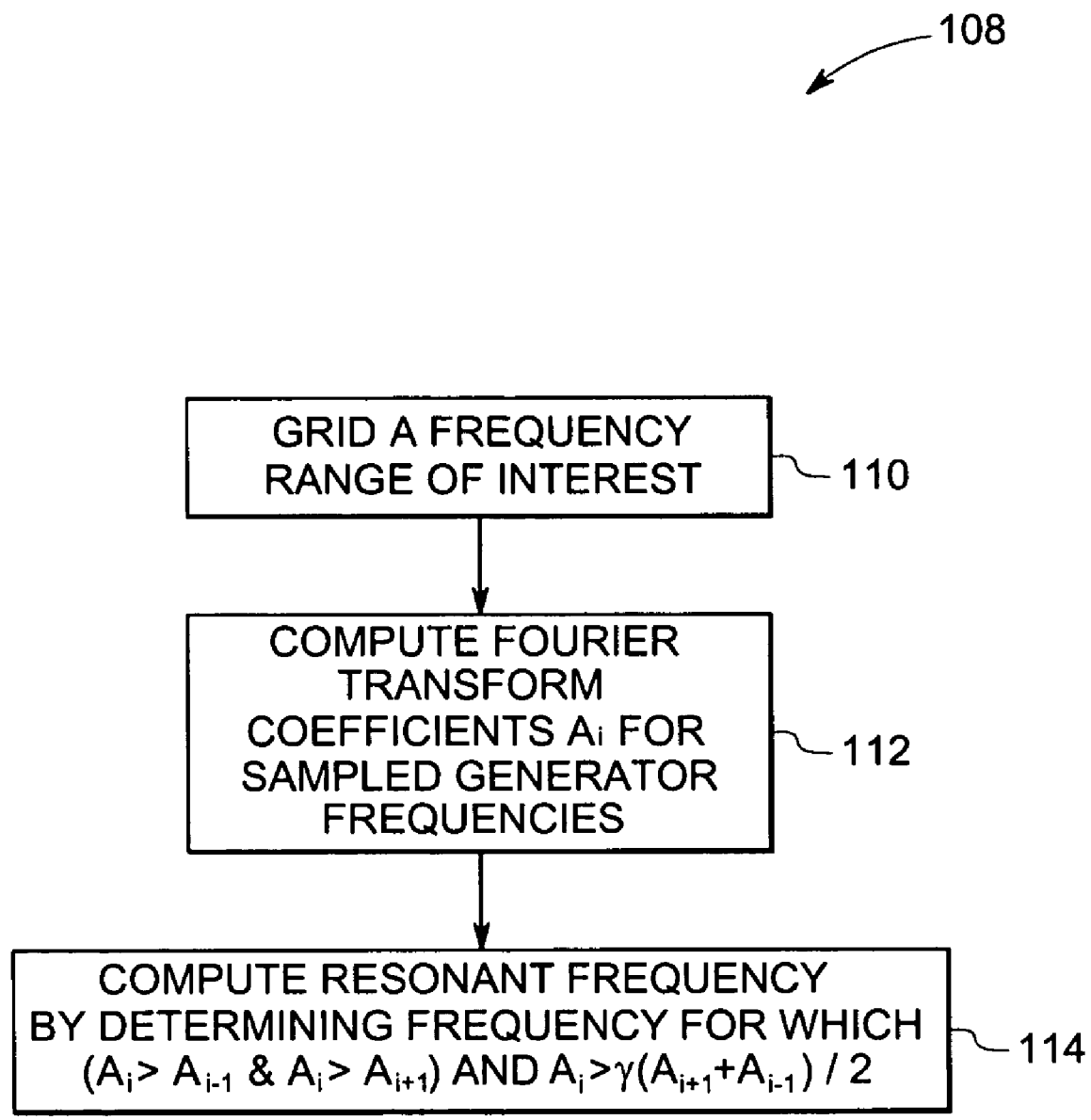
FIG. 5 is an exemplary flowchart illustrating a resonant peak detection algorithm.

Referring generally to FIG. 5, a Fourier transform based method to compute drive train and tower resonant frequencies is generally illustrated by a flowchart 108. The generator is grid into a predetermined frequency range, based on a prior knowledge of the frequency region where the resonant peak is likely to occur (block 110). This prior knowledge may be based on dynamics of the wind turbine system. The generator frequency co is then sampled over time and Fourier transform coefficients $A_i$ are computed for the generator frequencies sampled over time (block 112). At block 114, a peak is said to occur if a computed Fourier transform coefficient $A_i$ greater than its adjacent Fourier transform coefficient $A_{i-1}$ and $A_{i+1}$, and $A_i > \gamma(A_{i+1}+A_{i-1})/2$, where $\gamma$ is a factor adapted to filter out less sharp peaks. The choice of $\gamma$ depends on the dynamics of the system. The frequency at which the peak thus determined occurs would correspond to a resonant frequency. This method may be used to determine the drive train resonant frequency ($\omega_{DT}$), by sampling generator frequencies in a frequency grid within which $\omega_{DT}$ is expected to lie.

The tower oscillations are coupled to the drive train oscillations. Hence, the above method is also useful for determining the tower resonant frequency ($\omega_T$). However, the peak obtained for the tower may not be as sharp compared to the peak obtained for the drive train. In such a case, the generator frequency is sampled for a plurality of frequency grids within which the tower resonant frequency ($\omega_T$) is expected to lie, and peaks of Fourier transform coefficients are computed for each of the frequency grids. Assuming the tower resonant frequency ($\omega_T$) to be invariant, the above steps are repeated for a finer grid of frequencies is chosen around the invariant frequency, to obtain a sharper peak. This peak corresponds to the tower resonant frequency ($\omega_T$). Referring again to FIG. 2, resonant frequencies ($\omega_{DT}$ and $\omega_T$) may be periodically determined and provided to the damper 62 by peak detection system 73. Other damper parameters may then be computed using equations of motion of the drive train and/or the tower.

Figure 6:
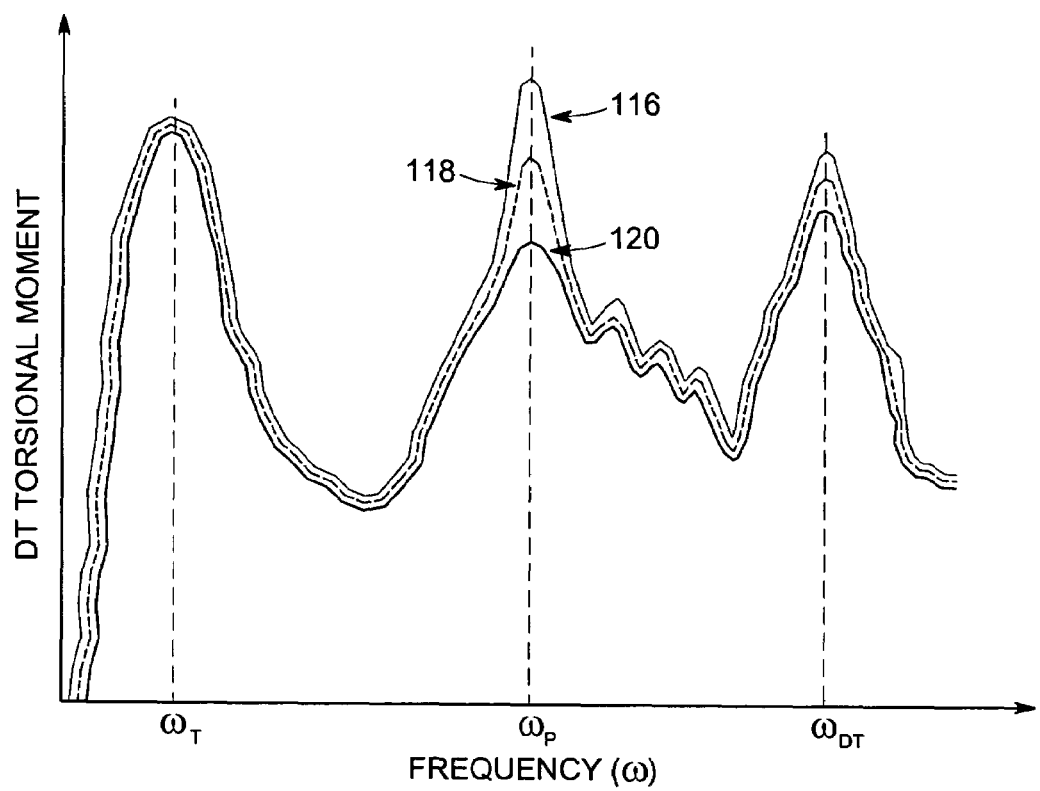
FIG. 6 is a graphical representation of the variation in drive train torsional moment with generator frequency for damped and undamped wind turbine systems.

Referring generally to FIG. 6, there is shown a spectral power density plot illustrating a graphical comparison of the variation of the drive train torsional moment as a function of generator frequency ω for damped and undamped systems. Curve 116 generally represents the torsional load variation for an undamped system, i.e., a system damped by material damping which is characteristic to the system. Curve 118 represents the for a system damped by the present techniques and curve 120 represents the same for a system damped by solely providing drive train compensation. As can be seen, the present technique provides adequate damping at the first drive train fundamental frequency ($\omega_{DT}$) and at the blade pass frequency ($\omega_P$).

Figure 7:
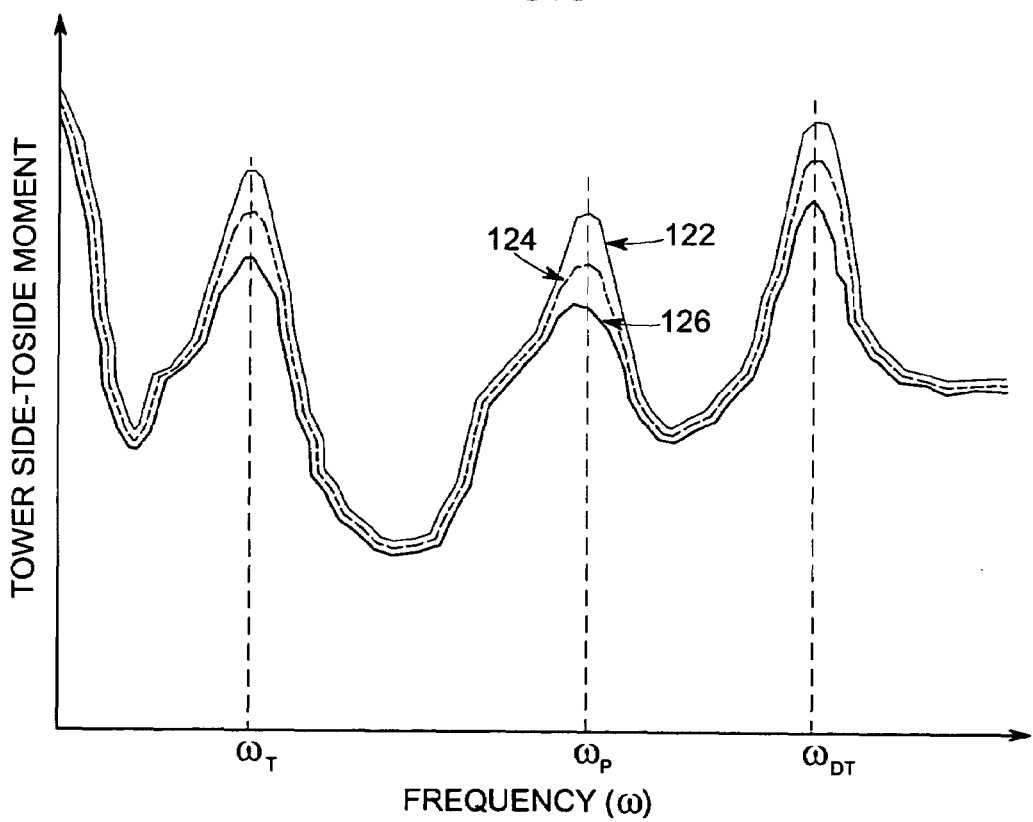
FIG. 7 is a graphical representation of the variation in tower side-to-side moment with generator frequency for damped and undamped wind turbine systems.

FIG. 7 shows a similar spectral power density plot for tower side-to-side moment. Here curves 122, 124 and 126 respectively correspond to an undamped system, a system damped by the present technique and a system damped by providing only drive train compensation. It can be seen that the present technique substantially reduce tower sis-to-side moment at the tower resonant frequency $\omega_T$.

The above described technique thus provide an active damping solution for mitigating drive train as well as tower oscillations, while reducing power fluctuation of the generator. The present technique advantageously uses a computationally inexpensive algorithm to obtain a reasonably accurate estimate of drive train and tower resonant frequencies. Another advantage of the present technique is that it uses only generator speed information and can thus be implemented without any additional hardware.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A vibration damping system for a wind turbine system mounted on a tower, the vibration damping system comprising:

a vibration damper operable to provide a variable signal to control torque produced by a generator of the wind turbine system, wherein the variable signal is based on generator speed and has a first local peak value based on a resonant frequency of tower side-to-side oscillation.

2. The system as recited in claim 1, further comprising a peak detection system operable to determine the resonant frequency of tower side-to-side oscillations.

3. The system as recited in claim 1, wherein the wind turbine system comprises a drive train to couple a turbine rotor to the generator, and wherein the peak detection system is operable to determine a resonant frequency of drive train oscillation.

4. The system as recited in claim 3, wherein the variable signal has a second peak value based on the resonant frequency of drive train oscillation.

5. The system as recited in claim 3, wherein the signal of the vibration damper has a lower value relative to the first peak value and the second peak value at a vibration frequency corresponding to turbine rotor frequency multiplied by the number of blades of the turbine rotor.

6. The system as recited in claim 1, wherein the variable signal has a substantially constant value for vibration frequencies greater than a predetermined vibration frequency.

7. The system as recited in claim 1, wherein the vibration damper comprises a processor operable to produce an output corresponding to a programming instruction that relate a vibration damper response and vibration frequency.

* * * * *